US012691614B2

(12) United States Patent
Prieur et al.

(10) Patent No.: US 12,691,614 B2
(45) Date of Patent: Jul. 28, 2026

(54) RESIN MOLDING PROCESS

(71) Applicant: PRATT & WHITNEY CANADA CORP., Longueuil (CA)

(72) Inventors: Vincent Prieur, Delson (CA); Patrick Cloutier, Sorel-Tracy (CA); Mario Robidoux, St-Bruno (CA); Remy Colin, Greenfield Park (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 319 days.

(21) Appl. No.: 18/524,068

(22) Filed: Nov. 30, 2023

(65) Prior Publication Data
US 2025/0178255 A1 Jun. 5, 2025

(51) Int. Cl.
| *B29C 45/14* | (2006.01) |
| *B29C 45/04* | (2006.01) |
| *B29C 45/72* | (2006.01) |
| *B29C 45/26* | (2006.01) |
| *B29K 63/00* | (2006.01) |
| *B29L 31/36* | (2006.01) |

(52) U.S. Cl.
CPC .... *B29C 45/14065* (2013.01); *B29C 45/0441* (2013.01); *B29C 45/7207* (2013.01); *B29C 2045/2671* (2013.01); *B29C 2945/76056* (2013.01); *B29K 2063/00* (2013.01); *B29L 2031/36* (2013.01)

(58) Field of Classification Search
None
See application file for complete search history.

(56) References Cited

U.S. PATENT DOCUMENTS

| 3,086,251 | A | * | 4/1963 | Bernat | .............. B29C 45/14639 |
| | | | | | 425/468 |
| 4,129,543 | A | | 12/1978 | Kaplan | |
| 4,256,444 | A | | 3/1981 | Suter | |
| 4,439,386 | A | | 3/1984 | Antczak | |
| 5,053,465 | A | | 10/1991 | Waddill | |
| 5,340,512 | A | | 8/1994 | Slocum et al. | |
| 5,804,126 | A | | 9/1998 | Karunaratne et al. | |
| 5,965,673 | A | | 10/1999 | Hermansen et al. | |
| 8,927,677 | B2 | | 1/2015 | Karunakaran et al. | |
| 9,289,920 | B2 | | 3/2016 | Duinen et al. | |
| 11,407,159 | B2 | | 8/2022 | Ishizaki et al. | |

(Continued)

FOREIGN PATENT DOCUMENTS

| CN | 107543745 B | 11/2020 |
| CN | 113134985 A | 7/2021 |

(Continued)

*Primary Examiner* — Mohammad M Ameen
(74) *Attorney, Agent, or Firm* — NORTON ROSE FULBRIGHT CANADA LLP

(57) ABSTRACT

A method for molding a connector boot over a connector of a wire harness comprises positioning the connector of the wire harness into a mold cavity of a mold. A resin mixture is de-aerated to provide a de-aerated resin mixture including a synthetic resin and a hardener. The de-aerated resin mixture is injected into the mold cavity to gradually fill the mold cavity from bottom to top. The injected de-aerated resin mixture is then allowed to harden to form the connector boot around the connector of the wire harness under iso-thermal conditions. Once cured, the connector boot is demolded.

15 Claims, 8 Drawing Sheets

(56)          References Cited

U.S. PATENT DOCUMENTS

| | | | |
|---|---|---|---|
| 2004/0037528 | A1 | 2/2004 | Kanai et al. |
| 2014/0239539 | A1* | 8/2014 | Messerly .............. B29C 33/306 |
| | | | 264/225 |
| 2018/0099445 | A1* | 4/2018 | Ishizaki ................... C08K 3/36 |

FOREIGN PATENT DOCUMENTS

| | | | | |
|---|---|---|---|---|
| CN | 114 211 668 A | * | 3/2022 | |
| CN | 114211668 | | 3/2022 | |
| CN | 116426089 A | | 7/2023 | |
| EP | 2351638 A1 | | 8/2011 | |
| JP | S555839 A | | 1/1980 | |
| JP | S6364709 A | | 3/1998 | |
| JP | 2003266453 | | 9/2003 | |
| JP | 2011 207 185 A | * | 10/2011 | |
| JP | 2011207185 | | 10/2011 | |
| JP | 2022 099 792 A | * | 7/2022 | |
| WO | 82/03296 A1 | | 9/1982 | |
| WO | 98/58788 A1 | | 12/1998 | |

* cited by examiner

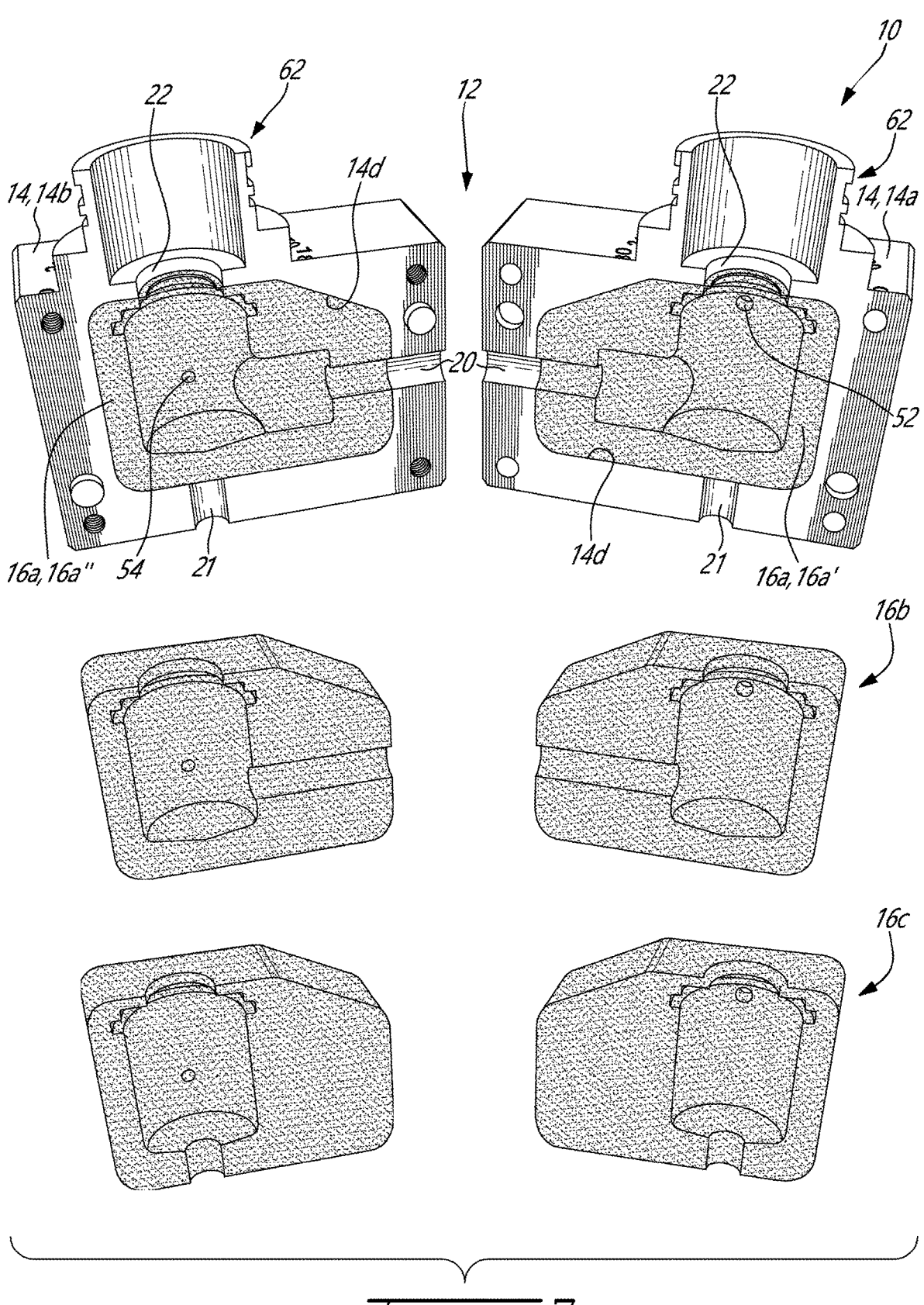

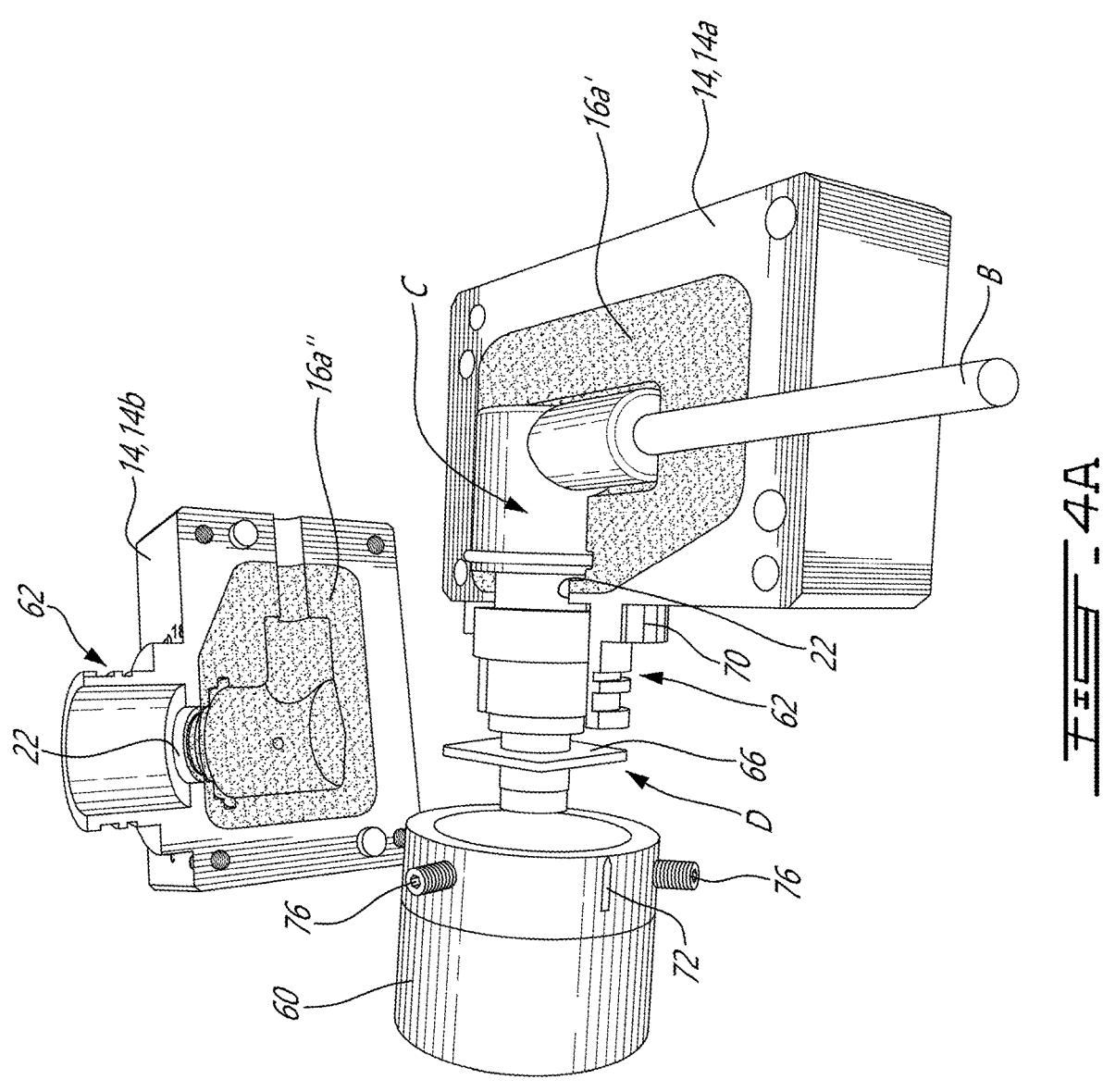
$\boxed{\text{FIG}}$ .4A

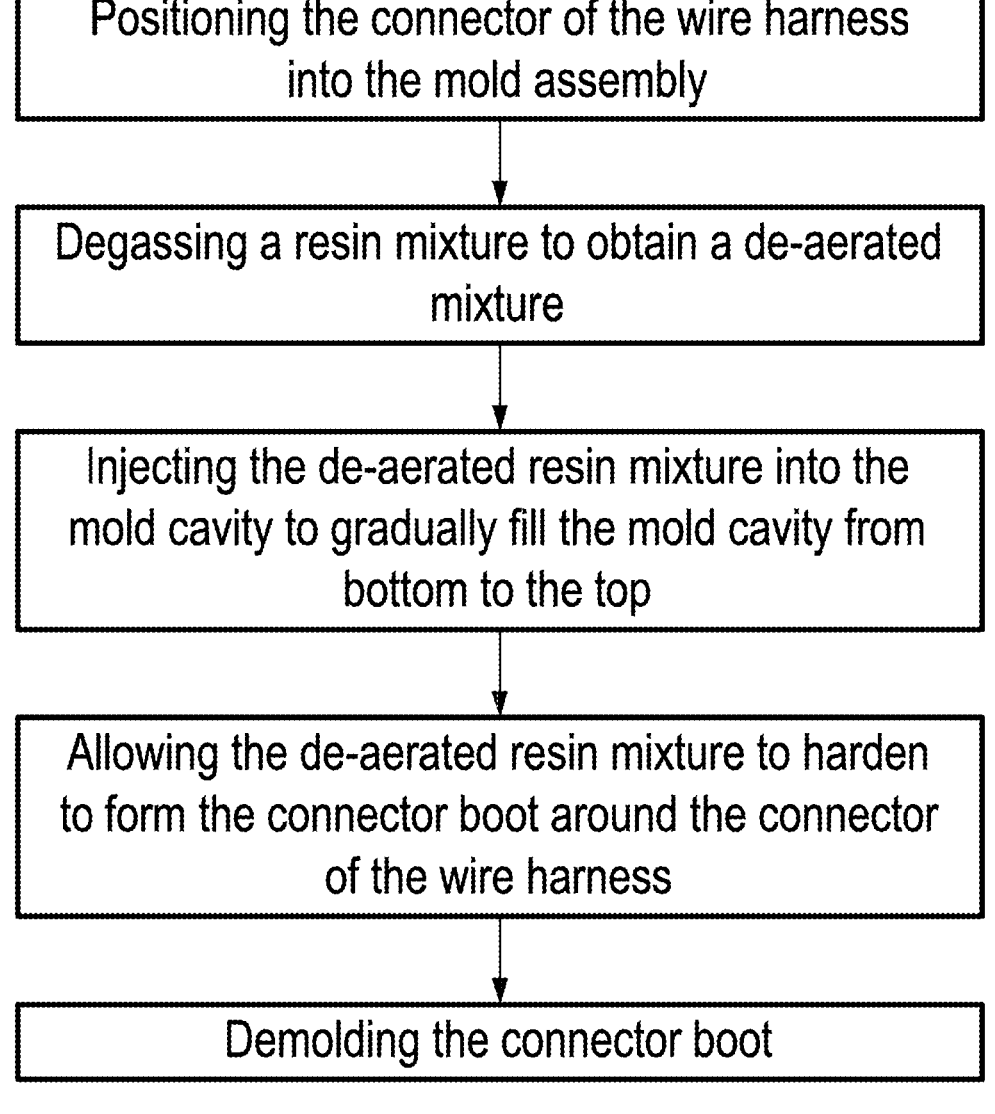

Positioning the connector of the wire harness into the mold assembly

Degassing a resin mixture to obtain a de-aerated mixture

Injecting the de-aerated resin mixture into the mold cavity to gradually fill the mold cavity from bottom to the top Allowing the de-aerated resin mixture to harden to form the connector boot around the connector of the wire harness Demolding the connector boot

FIG. 8

RESIN MOLDING PROCESS

TECHNICAL FIELD

The application relates generally to molding and, more particularly, to a process and a system suitable for molding a component, such as a connector boot, over a wire harness.

BACKGROUND OF THE ART

Wiring harnesses, also know as cable harnesses or wiring harnesses, mounted to aircraft engines are subject to various sources of stress including: vibrations, thermal cycles to name a few. Over time, wire connector boots can crack and or be otherwise damaged necessitating repair or replacement. Connector boots can also be damaged during handling, including installation or removal.

There is thus a need for continuous improvements in the manufacturing and replacement of wire harness connector boots.

SUMMARY

In one aspect, there is provided a method for molding a connector boot over a connector of a wire harness, the method comprising: positioning the connector of the wire harness into a mold cavity of a mold, the mold cavity having a bottom end and a top end; degassing a resin mixture to provide a de-aerated resin mixture, the de-aerated resin mixture including a synthetic resin and a curing agent, the curing agent configured to cure the synthetic resin from a flowable state to a solid state; injecting the de-aerated resin mixture into the mold cavity to gradually fill the mold cavity from the bottom end to the top end of the mold cavity; allowing the de-aerated resin mixture to harden to form the connector boot around the connector of the wire harness; and demolding the connector boot.

In another aspect, there is provided a method of molding an epoxy connector boot over a connector of a wire harness, the method comprising: positioning the connector of the wire harness into a mold cavity of a mold, the mold cavity having a bottom end and a top end; removing air from an epoxy resin mixture, the epoxy resin mixture including an epoxy resin and a curing agent operable to harden the synthetic resin over a curing time period; injecting the epoxy resin mixture into the bottom end of the mold cavity to gradually fill the mold cavity from the bottom to the top end thereof; and allowing the epoxy resin mixture to cure inside the mold to form a hardened epoxy connector boot around the connector of the wire harness.

In a further aspect, there is provided a method for injection molding a component over a base component, the method comprising: positioning the base component into a mold cavity of a mold, the mold cavity having a bottom end and a top end; degassing a resin mixture to provide a de-aerated resin mixture, the de-aerated resin mixture including a synthetic resin and a curing agent, the curing agent configured to cure the synthetic resin from a flowable state to a solid state; injecting the de-aerated resin mixture into the mold cavity to gradually fill the mold cavity from the bottom end to the top end of the mold cavity; allowing the de-aerated resin mixture to harden to form the injection molded component around the base component; and demolding.

DESCRIPTION OF THE DRAWINGS

Reference is now made to the accompanying figures in which:

FIG. 2 is a schematic isometric view of a molding system for molding connector boots over the connectors of wire harnesses, the system including a rigid outer shell and a set of interchangeable soft inner shells having different molding cavity geometries for molding different connector boot geometries;

FIG. 4a is a perspective view of a wire harness installed in a bottom half of the mold assembly and illustrating a cap rotatably engageable with the connector of the wire harness to angularly adjust the orientation of the connector prior to the connector boot molding operation;

FIG. 6 is a flow chart of a method for molding a connector boot.

DETAILED DESCRIPTION

Figure 1:
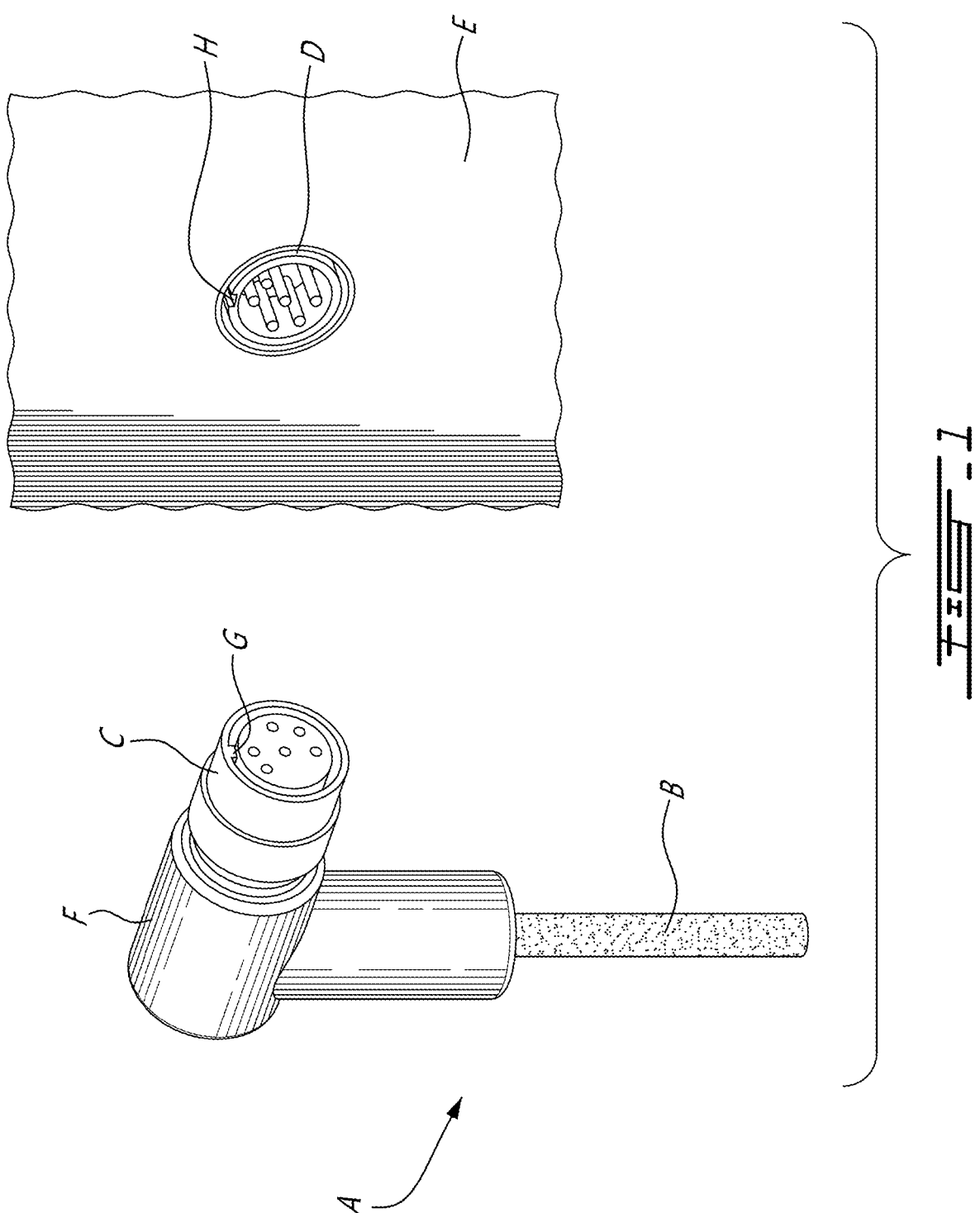
FIG. 1 is a schematic view of a wire harness comprising a connector boot molded over a connector, the connector of the wire harness configured for connection with a mating connector of a component of an aircraft engine.

FIG. 1 illustrates a wire harness A having a cable B including a bundle of wires connected to a connector C that is, in turn, configured for connection with a receptacle or mating connector D of a piece of equipment, such as an aircraft engine component E, to transfer electrical power, signals or data. A connector boot F is molded over the connector C of the wire harness A to provide strain relief and increase the attachment between the cable B and the connector C. The connector boot F is molded from a suitable resin material (e.g., epoxy), which once fully cured, is adapted to withstand the environmental conditions in which the wire harness A is to be installed and provide sufficient strength to effectively limit the bend radius of the wire harness A and prevent damages caused by kinking or snagging, impacts, vibrations, pressure and temperature to name a few. The mating connectors C and D may be provided with alignment/keying features to prevent mating in an incorrect orientation. For instance, a first one of the connectors (e.g., the wire harness connector C) may have one or more alignment pins or keys G for engagement with one or more corresponding keyways or notches H in the second one of the connectors (e.g., the aircraft component connector D). The connector C of the exemplified wire harness A is a right-angle connector. However, it is understood that the connector C could have other configurations. For instance, the connector of the wire harness could be a linear/straight connector.

FIG. 2 illustrates parts of a molding system 10 suitable for molding a connector boot over the connector of a wire harness, such as the wire harness A exemplified in FIG. 1. The system 10 generally comprises a mold assembly 12 having an outer shell 14 and a set of interchangeable inner shells 16a, 16b, 16c . . . (only 3 sets of inner shells being illustrated for brevity) selectively removably positionable in a complementary fashion inside the outer shell 14, the inner shells 16a, 16b, 16c . . . having different internal surface geometries for molding different geometries of connector boots in a same base mold (i.e., in the same outer shell 14). The interchangeable inner shells 16a, 16b, 16c . . . of the mold assembly 12 facilitate the change of connector boot form/geometry to be molded without changing the entire mold. That is different connector boot models/geometries can be molded over different wire harnesses using the same base mold. Such a mold assembly with interchangeable inner shells uses lesser tools, requires the handling of lesser parts and consequently generates economic savings.

The outer shell 14 of the mold assembly 12 may be provided in the form of a rigid metal shell comprising a first outer shell part and a second outer shell part configured to be assembled together around the connector C of the wire harness A. According to some embodiments, the first and second outer shell parts respectively correspond to the bottom half 14a and the top half 14b of the outer shell 14 (i.e., the outer shell 14 is divided into two halves adapted to be assembled along a median horizontal parting line). As can be appreciated from FIGS. 2, 3b and 3c, the bottom and top halves 14a, 14b of the outer shell 14 define an internal cavity 14c bounded by a cavity surface 14d. The interchangeable inner shells 16a, 16b, 16c . . . have a same outer surface geometry that is complementary to the geometry of the cavity surface 14d of the internal cavity 14c of the outer shell 14 (i.e., the outer surface of the inner shells 16a, 16b, 16c . . . and the cavity surface 14d of the internal cavity 14c of the outer shell 14 have mutually complementing shapes). That is the common outer surface geometry of the interchangeable inner shells 16a, 16b, 16c . . . is a positive of the internal cavity 14c of the outer shell 14. In this way, each inner shell 16a, 16b, 16c . . . can be removably received in a unique position as a lining over the cavity surface 14d of the outer shell 14.

Figure 3A:
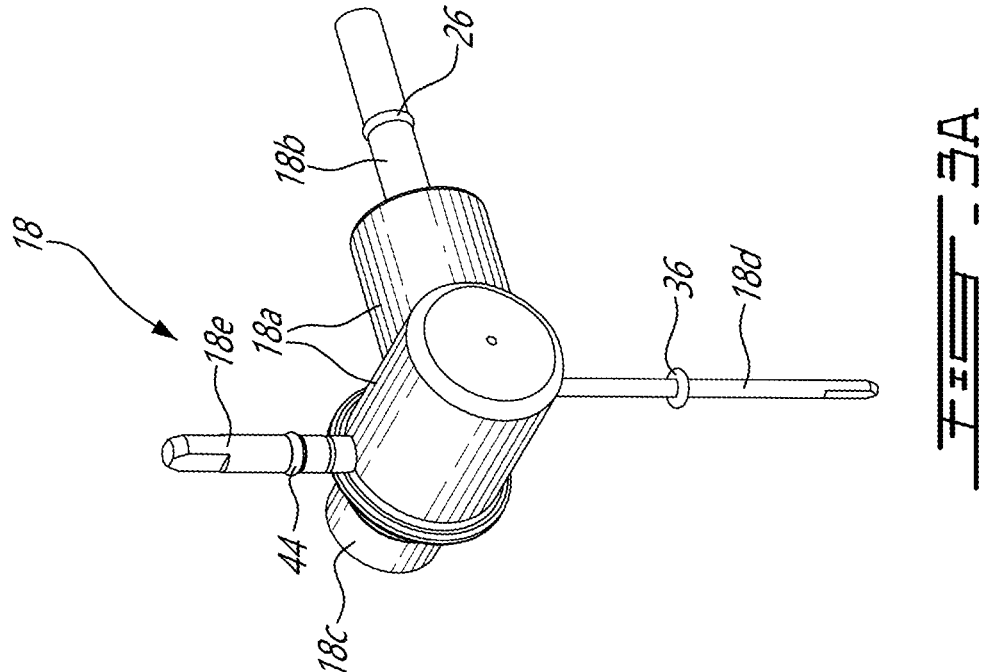
FIG. 3a is an isometric view of a dummy connector which can be used together with the outer shell of the molding system for producing an inner shell of the interchangeable inner shells of the system.
Figure 3C:
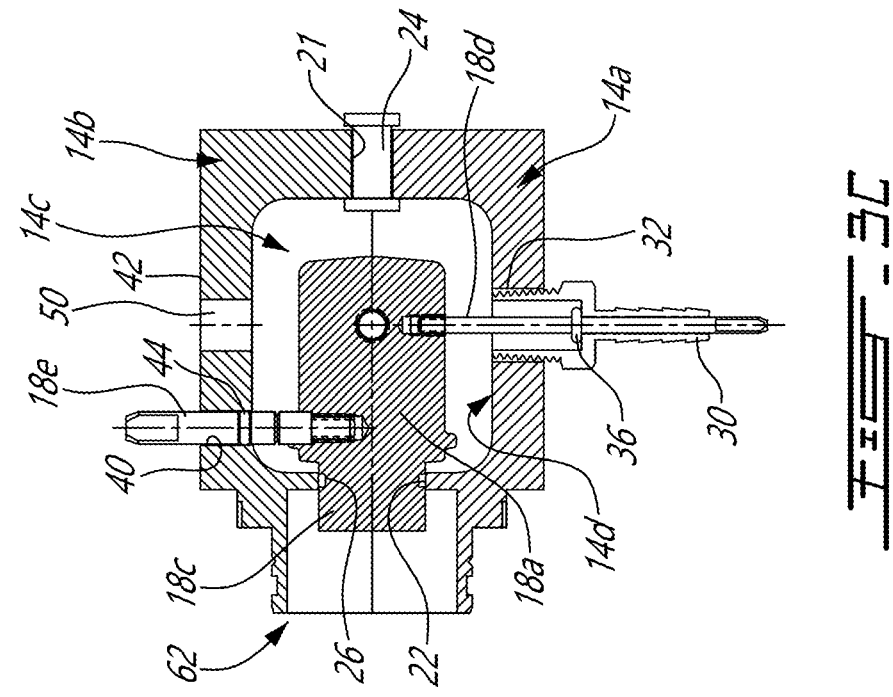
FIG. 3c is a cross-section view taken along line 3C-3C of FIG. 3b.
Figure 3B:
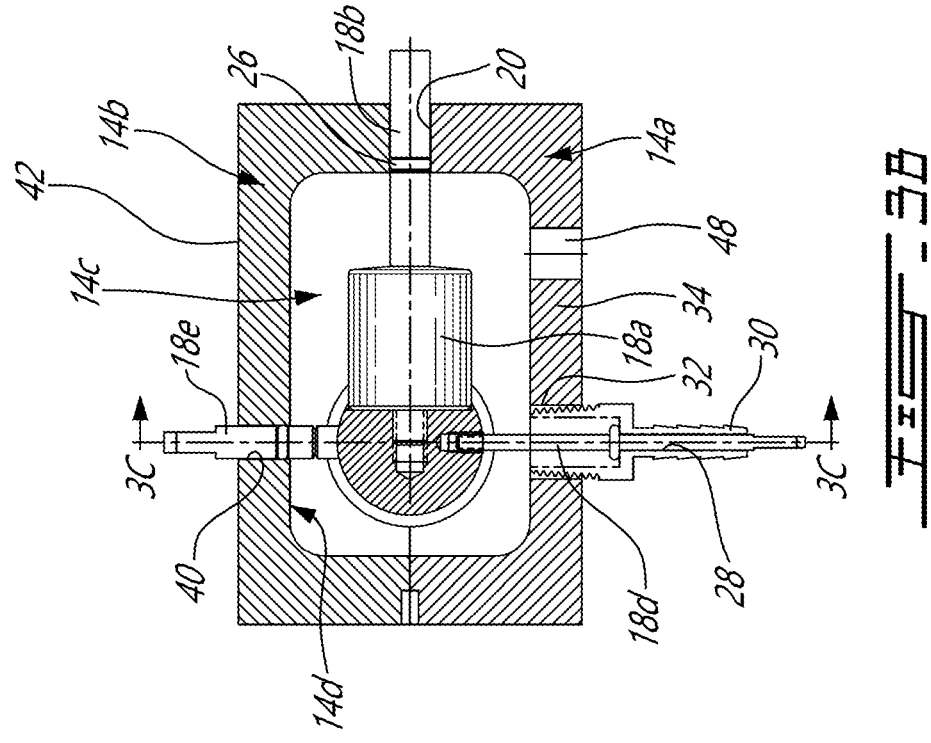
FIG. 3b is a front cross-section view illustrating the dummy connector of FIG. 3a installed in the outer shell in preparation of the molding of an inner shell.

Referring to FIGS. 3a to 3c, it can be appreciated that the interchangeable inner shells 16a, 16b, 16c . . . can be molded inside the outer shell 14. According to some embodiments, dummy connectors are selectively positioned in the internal cavity 14c of the outer shell 14 for molding respective ones of the interchangeable inner shells 16a, 16b, 16c . . . . FIG. 3a illustrates an example of such a dummy connector 18. The exemplified dummy connector 18 has a main body, which replicates the geometry/shape of the wire harness connector C over which the connector boot F is to be molded. That is the main body of the dummy connector 18 has the same outer geometrical features/outline as the connector C over which the connector boot F will be molded. The dummy connector 18 can be created by any suitable means. For instance, the dummy connector 18 can be machined from a solid block of material, such as aluminum, based on measurements taken from an existing connector of a wire harness or from a CAD model generated from the design specifications of the original connector. The model created with CAD can be manufactured as a physical component using any suitable manufacturing processes, such as CNC machining, 3D printing, additive manufacturing or any other suitable manufacturing processes.

The dummy connector 18 illustrated in FIG. 3a is based on the design specifications of a right-angle connector. However, it is understood that the same principles could be applied to other angularly oriented connectors, including linear/straight connectors and 45 degrees connectors to name a few. The main body of the exemplified connector 18 comprises a connector boot portion 18a (i.e., the portion of the connector over which the connector boot is to be molded), a cable portion 18b extending from a cable side of the connector boot portion 18a and a connector portion 18c extending from the connector contact side of the connector boot portion 18a. The cable portion 18b and the connector portion 18c respectively correspond to a portion of the cable B extending from the right-angle connector C and to the connecting end portion of the connector C projecting out from the connector boot F on the wire harness A shown in FIG. 1. As can be appreciated in FIGS. 3b and 3c, the cable portion 18b and the connector portion 18c of the dummy connector 18 are respectively received in corresponding cable and connector holes 20 and 22 defined in the outer shell 14. For right angle connectors, the cable hole 20 and the connector hole 22 are defined in two different orthogonal sides of the outer shell 14. According to some embodiments and as shown in FIGS. 2, and 3c, the outer shell 14 can be provided with a second cable hole 21 that is axially aligned with the connector hole 22, thereby allowing the same outer shell 14 to be used for both linear and right-angle connector applications. As will be seen hereafter and as shown in FIG. 3c, the mold assembly 12 may further comprise a cable hole plug 24 to plug the unused cable hole (i.e., the right-angle cable hole 20 or the straight cable hole 21) of the outer shell 14 during molding. According to the illustrated embodiment, the parting plane of the bottom and top halves 14a, 14b of the outer shell 14 extends centrally through the cable and connector holes 20, 21 and 22 (i.e., a first half of the cable and connector holes is defined in the bottom half 14a of the outer shell 14 and a second haft of the cable and connector holes is defined in the top half 14b of the outer shell 14). As shown in FIGS. 3a-3c, O-rings 26 may be provided on the cable portion 18b and the connector portion 18c of the dummy connector 18 to seal the cable and connector holes 20, 21 and 22 during molding of the inner shell 16a, 16b, 16c . . . . Other suitable sealing arrangements are contemplated. The cable portion 18b and the connector portion 18c of the dummy connector 18 act as support arms for supporting the connector boot portion 18a in the internal cavity 14c of the outer shell 14. The cable portion 18b and the connector portion 18c can be integral to the connector boot portion 18a or detachably mounted thereto.

Still referring to FIGS. 3a-3c, it can be appreciated that the dummy connector 18 further comprises a connector boot injection hole plug or first arm 18d extending downwardly from the connector boot portion 18a of the main body of the dummy connector 18 to plug an injection hole 28 defined in a fitting 30 threadedly engaged in a connector boot injection port 32 defined in a bottom wall 34 of the bottom half 14a of the outer shell 14. It can be appreciated that the arm 18d will form an injection hole in the inner shell 16a after the same has been molded over the dummy connector 18. As shown in FIGS. 3a-3c, an O-ring 36 can be provided on the first arm 18d to enhance sealing of the injection hole 28 of the fitting 30 from the internal cavity 14c of the outer shell 14 during the molding of the inner shell 16a. The first arm 18d can be threadedly mounted or otherwise detachably connected to the connector boot portion 18a of the main body of the dummy connector 18.

Still referring to FIGS. 3a-3c, it can be seen that the dummy connector 18 further comprises an overflow hole plug or second arm 18e extending upwardly from the connector boot portion 18a of the main body of the dummy connector 18 for plugging a first overflow hole 40 defined in a top wall 42 of the top half 14b of the outer shell 14. It can be appreciated that this second arm 18e will produce an overflow hole in the inner shell 16a after the same has been molded in the outer shell 14 over the dummy connector 18. An O-ring 44 may be provided on the second arm 18e to better seal the overflow hole 40 during molding of the inner shell 16a. Like the first arm 18d, the second arm 18e can be threadedly mounted or otherwise detachably connected to the connector boot portion 18a of the main body of the dummy connector 18.

In use, the dummy connector 18 is positioned on the bottom half 14a of the outer shell 14 with the cable portion 18b and the connector portion 18c respectively resting on the bottom half of the cable hole 20 and the connector hole 22 and with the first arm 18d of the dummy connector 18 engaged in the connector boot injection hole 28 of the injection fitting 30. The plug 24 is also positioned in the bottom half of the unused cable hole 21. Then, the top half 14b of the outer shell 14 is seated on top of the bottom half 14a of the outer shell 14 with the second arm 18e of the dummy connector 18 extending into the overflow hole 40, and the two outer shell halves 14a, 14b are clamped together to imprison the connector boot portion 18a of the dummy connector 18 within the internal cavity of the outer shell 14. Dowel pins or the like may be provided at the mounting interface of the bottom and top halves 14a, 14b of the outer shell 14 to ensure proper alignment. The dowel pins may be mounted in corresponding holes defined in the parting plane of the bottom and top halves 14a, 14b of the outer shell 14. Once the outer shell 14 has been properly assembled over the dummy connector 18, a flowable resin, such as a silicon resin, is injected inside the internal cavity 14c of the outer shell 14 via an inner shell injection hole 48 (FIG. 3b) defined in the bottom wall 34 of the bottom half 14a of the outer shell 14. The resin gradually fills the internal cavity 14c from bottom to top. According to some embodiments, the resin could be injected according to other orientations. A second overflow hole 50 (FIG. 3c) is provided in the top wall 42 of the top half 14b of the outer shell 14 for excess resin to flow out of the outer shell 14 when the internal cavity 14c starts to fill up. The second overflow hole 50 also acts a vent for venting air from the internal cavity 14c as the same is being filled up with the resin. After completing the injection process, the resin (e.g., the silicon resin) is allowed to cure to form the inner shell 16a around the dummy connector 18 and then the outer shell 14 is opened. The molded inner shell 16a is retrieved from the outer shell 14 and cut in half, thereby providing bottom and top inner shell halves 16a', 16a" respectively positionable in a complementary fashion inside the bottom and top outer shell halves 14a, 14b for the subsequent molding of the connector boot F over the connector C of the wire harness A. As shown in FIG. 2, the so produced inner shell 16a has an injection hole/passage 52 and an overflow hole 54 which are respectively aligned in registry with the corresponding connector boot injection hole 28 and the overflow hole 40 of the outer shell 14. In this way, the inner shell and the outer shell halves may be assembled together to form a mold assembly to mold a connector boot F over a given model of connector of virtually any wire harnesses.

From the foregoing, it can be appreciated that the use of a dummy connector for each connector shape to be molded allows to have the same repeatability for a same model of connector. Indeed, the use of a dummy connector instead of an originally made connector part to be repaired avoids replicating imperfections that might be present on the original part.

Figure 4B:
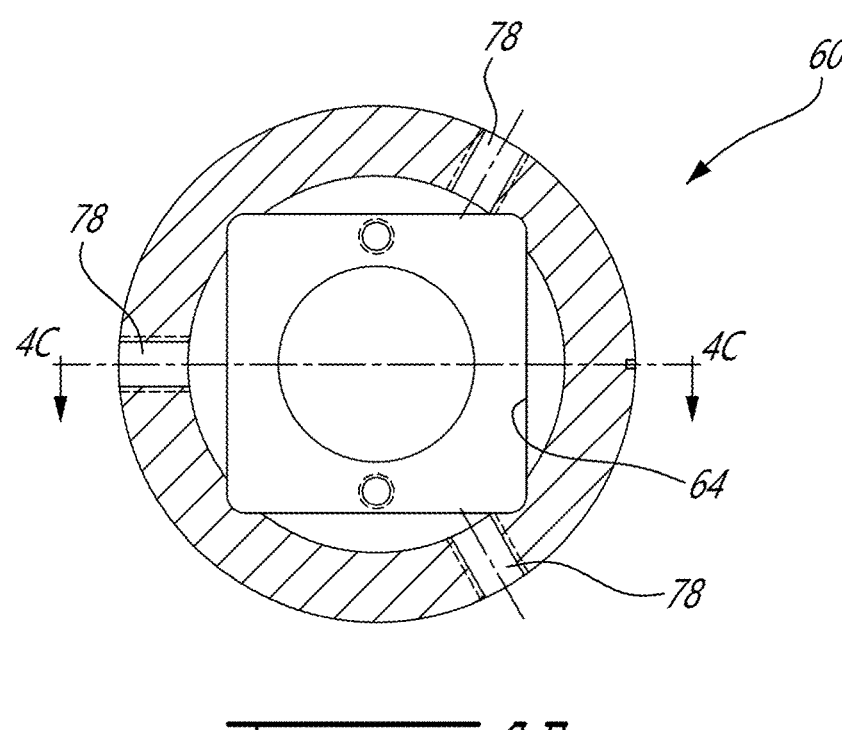
FIG. 4b is an end cross-section view of the cap illustrating a square socket for rotatably drivingly engaging the connector.
Figure 4C:
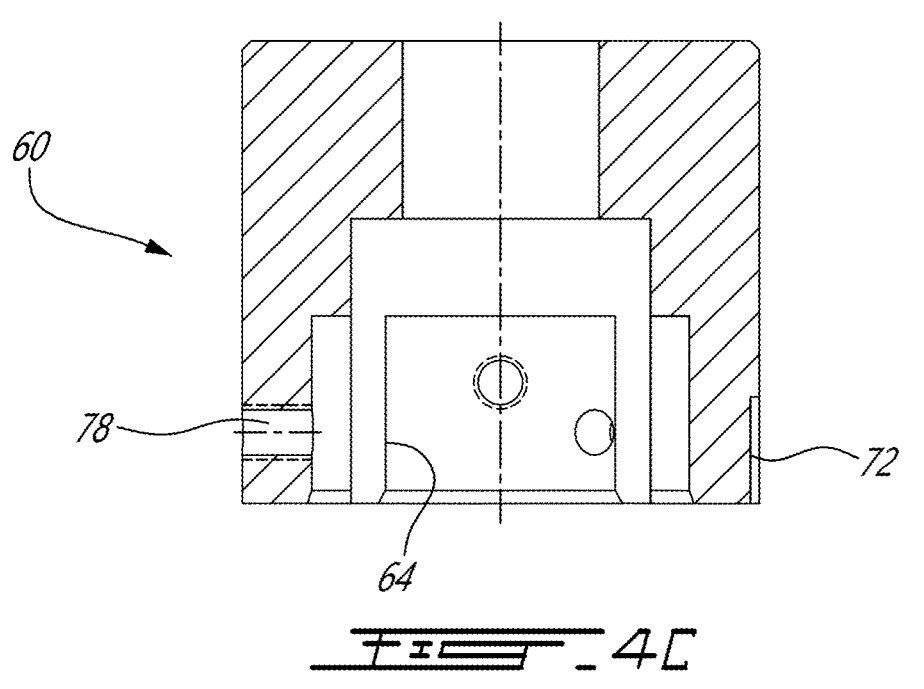
FIG. 4c is a cross-section view of the cap taken along line 4C-4C of FIG. 4b.

As shown in FIGS. 4a-4c, it can be seen that the molding system 10 further comprises a cap 60 having a clocking feature to angularly adjust the position of the keying/aligning features (such as the exemplified key G and keyway H of mating connectors C and D illustrated in FIG. 1) of connectors of wiring harnesses prior to molding connector boots over the connectors. The cap 60 is rotatably engageable over a cylindrical hollow protrusion or neck 62 projecting outwardly from the outer shell 14 centrally around the connector hole 22 in which the connector C of the wire harness A is to be positioned for the molding of the connector boot F, as shown in FIG. 4A. As shown in FIGS. 4b-4c, the cap 60 has a polygonal socket 64 (a square socket in the illustrated example) defined in one end thereof for driving engagement with a mating polygonal flange 66 (a square flange in the illustrated example) of a connector/receptacle corresponding to the connector/receptacle D of the aircraft equipment E to which the connector C of the wire harness A is to be connected in a predetermined relative angular orientation.

To adjust the angular position of the wire harness connector C prior to the molding of the connector boot F, the connector/receptacle D with the polygonal flange 66 is first connected to the mating connector C of the wire harness A and the wire harness A is positioned in the bottom half of the mold assembly 12 (i.e., the bottom half 14a of the outer shell 14 lined with the bottom half 16a' of the inner shell 16 as shown in FIG. 4a) with the mating portions of the connectors C, D accommodated inside the hollow cylindrical protrusion or neck 62 and with the flange 66 of the equipment connector/receptacle D lying outside of the neck/cylindrical protrusion 62 of the outer shell 14. Then, the top half of the mold assembly (the top half 14b of the outer shell 14 lined with the top half 16a" of the inner shell 16) is positioned over the bottom half of the mold assembly and the two mold halves are secured together. Thereafter, the cap 60 is engaged over the cylindrical projection 62 so as to engage the polygonal flange 66 of the flanged connector D with the corresponding polygonal socket 64 of the cap 60. Then, the cap 60 is rotated to rotate the connectors C, D to a predetermined angular position. A dial including an angular scale 70 and a pointer 72 is provided on respective ones of the outer shell 14 and the cap 60 to precisely adjust the angular position of the connectors C, D. According to some embodiments, the angular scale 70 comprises a circular scale including angle markings from 0 degrees to 360 degrees on the outer shell 14 around the cylindrical protrusion 62. The pointer 72 may be provided in the form of a visual mark or line on an outer circumferential surface of the cap 60. The system further comprises fasteners 76 (FIG. 4a) for releasably securing the cap 60 in the desired angular position on the cylindrical protrusion 62 of the outer shell 14. The fasteners 76 may be provided in the form of set screws threadedly engaged in respective side holes 78 (FIGS. 4b and 4c) defined in the cap 60 for engagement with the outer surface of the cylindrical protrusion 62.

Figure 5:
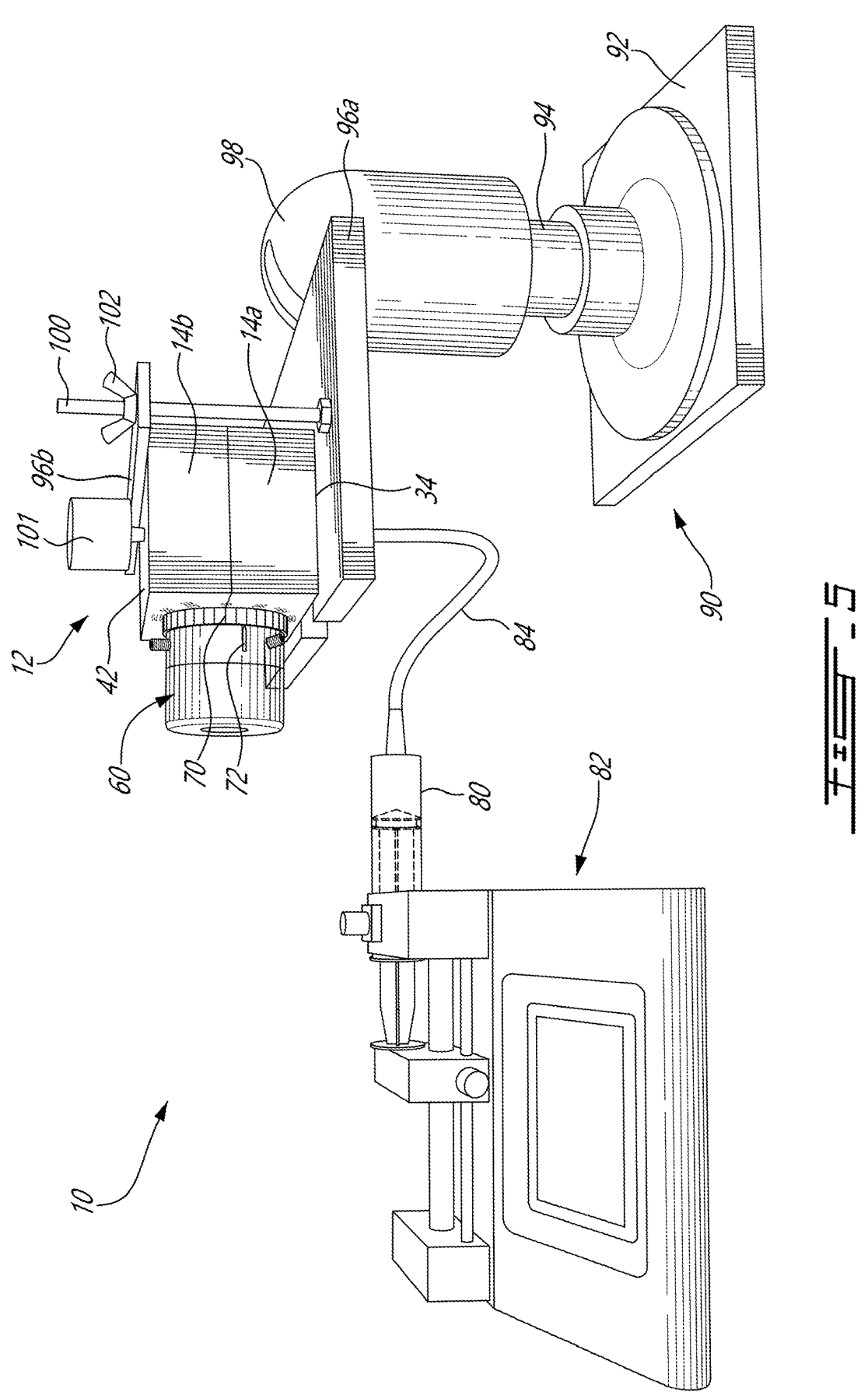
FIG. 5 is a schematic isometric view of the molding system including a pump syringe, a syringe for injecting a resin mixture into the mold assembly over the connector of the wire harness, and an articulated fixture for holding the mold assembly during the injection process.

Turning to FIG. 5, it can be seen that the molding system 10 may further comprise a syringe 80 fluidly connected to the fitting 30 of the connector boot injection port 32 in the bottom wall 34 of the bottom half 14a of the outer shell 14. The system 10 may also comprise a syringe pump 82 operatively connected to the syringe 80 for injecting a resin mixture into the mold assembly 12 for molding the connector boot F over the connector C of the wire harness A. The syringe pump 82 may be adjusted to inject the resin mixture at a predetermined flow rate. A flexible tube 84 may be used to fluidly connect the syringe 80 to the fitting 30 on the mold assembly 12.

Still referring to FIG. 5, it can be seen that the system 10 may further comprise a fixture 90 for holding the mold assembly 12 during the injection process. According to some embodiments, the fixture 90 comprises a base 92 including a table clamp, a column 94 projecting upwardly from the base 92 and any suitable mold retaining mechanisms, such as a pair of mold clamping plates 96a, 96b, articulately mounted to the column 94 via a ball joint 98 or the like. The exemplified retaining mechanism comprise a base plate 96a upon which the mold assembly 12 may be seated and a top plate 96b engageable on a pair of threaded rods 100 projecting upwardly from the base plate 96a. Wing nuts 102 are threadedly engageable with the threaded rods 100 for clamping the mold assembly 12 between the top plate 96b and the base plate 96a. A locking mechanism is operatively connected to the ball joint 98 for releasably holding the pair of mold clamping plates 96a, 96b in different positions relative to the column 94 and the base 92 during the injection process.

From the foregoing, it can be appreciated that the molding system 10 can be used to mold a replacement connector boot over the connector of an impaired wire harness or over the connector of a new wire harness. For instance, a damaged connector boot can be removed from the wire harness and a new connector boot can be molded over the connector of the impaired wire harness using the mold assembly 12 of the system 10. According to another possible application, the system 10 can be used to mold a new boot directly over a damaged boot or over only a portion of the damaged boot (i.e., in some applications the damaged boot may not need to be removed).

According to some embodiments and as illustrated by the flowchart of FIG. 6, a method for molding a connector boot generally comprises: positioning the connector C of the wire harness A into the mold assembly 12; degassing a resin mixture (e.g., an epoxy resin mixture); injecting the de-aerated resin mixture into the mold cavity to gradually fill the mold cavity from bottom to the top; allowing the de-aerated resin mixture to harden to form the connector boot F around the connector C of the wire harness A; and demolding the connector boot F.

The resin mixture may include a synthetic resin and a curing agent (i.e., a hardener) configured to chemically react with the synthetic resin so as to cure the resin from a flowable state to a solid state under isothermal conditions (i.e., without the addition of heat). In this way, there is no need to heat the mold to cause the resin to harden. The process may be conducted at substantially constant temperature. According to some embodiments, the synthetic resin and the curing agent are mixed and injected into the mold assembly 12 at room temperature. The injected resin mixture is then allowed to cure at room temperature inside the mold assembly 12.

The resin mixture may be de-aerated in a vacuum chamber prior to injection into the mold assembly 12. For instance, the synthetic resin and the curing agent can be mixed together in a suitable receptacle (e.g. a bowl), degassed by appropriate means, then poured in the syringe 80 before injection into the mold assembly 12. By so removing the air/gas from the resin mixture better material integrity can be obtained in the final product after the resin has hardened around the connector C of the wire harness A in the mold assembly 12. It may prevent the presence of air bubbles in the connector boot material. This may lead to better structural properties and enhanced surface finish of the connector boot F. By injecting the resin material into the bottom of the mold and thus filing the mold from bottom to top, the probability of having air bubbles trapped in the connector boot material can be further reduced.

The de-aerated mixture is injected at a slow rate into the mold. Satisfactory results have been obtained by injecting the de-aerated resin mixture into the mold assembly 12 at a flow rate between 2 ml/min and 4 ml/min. It is understood that the injection flow rate may vary depending on the viscosity of the resin mixture. The syringe pump 82 can be calibrated to push on the plunger of the syringe 80 to inject the resin mixture at the desired rate. It is understood that other suitable resin injection arrangements could be used, the syringe pump 82 and associated syringe 80 being only one possible example.

During the injection period, the mold assembly 12 can be tilted in different orientations to ensure proper filing of the mold cavity around the connector C of the wire harness A and, thus, avoid the formation of air cavities in the outer surface of the connector boot F. This can be conveniently achieved using an articulated fixture for holding the mold assembly 12 as for instance shown in FIG. 5. Indeed, the operator can use the articulated fixture 90 to manually sequentially position the mold assembly 12 at different angles of inclination while the resin mixture is being injected.

The operator knows that the mold cavity is completely full when some of the resin mixture starts to flow out from the overflow hole 40 in the top wall 42 of the outer shell 14 of the mold assembly 12. A small container 101 (FIG. 5) can be connected to the overflow hole 40 to collect the excess resin flowing out from the mold assembly 12. Once the mold cavity is full, the syringe pump 82 can be shut down.

After the injection step, the resin mixture is allowed to cure within the mold assembly 12. It is understood that the curing period may vary depending on the resin material used for molding the connector boot F. According to one example of an epoxy resin, the curing period within the mold assembly is between 18 and 24 hours. After, this "isothermal" curing step, the mold assembly 12 can be opened to expose the molded connector boot F on the wire harness A. The demolded connector boot can then be submitted to a heat treatment to finalise the curing process and further improve the structural properties of the newly molded connector boot. This can be achieved by placing the wire harness in an oven and heating the wire harness at a temperature of about 100 Celsius for about 1 hour. The heat treatment process can be used as part of a quality control process to determine the presence of air bubbles in the resin material.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite articles "a" and "an" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, it is understood that while the present technology as been described in the context of a connector boot of a wiring harness, the above described system and method could be used to provide different injection molded components over different articles (i.e., various aspects of the disclosed system and method could be applied to different products).

The invention claimed is:

1. A method for repairing a damaged connector boot of an impaired wire harness, the method comprising:

removing the damaged connector boot from the impaired wire harness;

producing a dummy connector having an outer surface geometry corresponding to that of the damaged connector boot to be replaced;

molding a silicon shell around the dummy connector;

demolding the dummy connector;

positioning the silicon shell in an outer rigid shell, the silicon shell and the outer rigid shell forming a mold used for molding a new connector boot; and then molding the new connector boot over the connector of the wire harness, wherein molding the new connector boot comprises:

positioning the connector of the wire harness into a mold cavity of the mold, the mold cavity having a bottom end and a top end;

degassing a resin mixture to provide a de-aerated resin mixture, the de-aerated resin mixture Including a synthetic resin and a curing agent, the curing agent configured to cure the synthetic resin from a flowable state to a solid state;

injecting the de-aerated resin mixture into the mold cavity to gradually fill the mold cavity from the bottom end to the top end of the mold cavity;

allowing the de-aerated resin mixture to harden to form the new connector boot around the connector of the wire harness; and demolding the new connector boot.

2. The method of claim 1, wherein the de-aerated resin mixture is allowed to harden in the mold under isothermal conditions.

3. The method of claim 1, wherein the injecting the de-aerated resin mixture into the mold and the allowing the de-aerated resin mixture to harden are isothermal processes.

4. The method of claim 1, wherein the injecting the de-aerated resin mixture comprises injecting the de-aerated resin mixture at a flow rate between 2 ml/min and 4 ml/min.

5. The method of claim 1, wherein the injecting the de-aerated resin mixture comprises using a syringe pump to push on a plunger of a syringe containing the de-aerated resin mixture, the syringe pump calibrated to provide a predetermined injection flow rate.

6. The method of claim 1, wherein the mold has an overflow hole at the top end of the mold cavity, and wherein during the injecting the de-aerated resin mixture into the mold cavity, air is evacuated from the mold cavity via the overflow hole, and wherein injection is stop after the de-aerated resin mixture starts to flow out from the overflow hole.

7. The method of claim 1, further comprising tilting the mold in different orientations during the injecting the de-aerated resin mixture into the mold cavity.

8. The method of claim 7, wherein the mold is mounted to an articulated fixture, and wherein the tilting the mold comprises adjusting the articulated fixture to sequentially position the mold at different angles of inclination.

9. The method of claim 1, further comprising submitting the new connector boot to a heat treatment after the demolding of the connector boot.

10. The method of claim 9, wherein submitting the new connector boot to the heat treatment comprises placing the wire harness in an oven.

11. The method of claim 1, wherein prior to degassing the resin mixture, the method comprises mixing the synthetic resin and the curing agent together, the synthetic resin comprising an epoxy resin, and wherein the curing agent is provided in the form of a hardener configured to chemically react with the epoxy resin when mixed therewith.

12. The method of claim 1, wherein the degassing the resin mixture comprises bleeding air contained in the resin mixture using a source of vacuum.

13. The method of claim 1, wherein the positioning the connector of the wire harness into the mold comprises adjusting an angular orientation of the connector in the mold.

14. The method of claim 13, wherein the adjusting the angular orientation of the connector in the mold comprises rotating the connector about a central axis thereof via a drive socket defined in a cap rotatably mounted to the mold.

15. The method of claim 14, wherein the adjusting the angular orientation of the connector in the mold comprises aligning an indicator mark provided on the cap with an angular marking of an angular circular scale provided on an outer surface of the mold.

\* \* \* \* \*